US011441057B2

(12) United States Patent
Twardowska et al.

(10) Patent No.: US 11,441,057 B2
(45) Date of Patent: Sep. 13, 2022

(54) AUTOBODY REPAIR FORMULATION WITH IMPROVED CONTROL OF WORK TIME AND CURE TIME AT EXTREME AMBIENT AIR TEMPERATURES

(71) Applicant: Illinois Tool Works Inc., Glenview, IL (US)

(72) Inventors: Helena Twardowska, Cincinnati, OH (US); Robert Mark Adams, Cincinnati, OH (US); David McKinney, Cincinnati, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 184 days.

(21) Appl. No.: 16/745,421

(22) Filed: Jan. 17, 2020

(65) Prior Publication Data

US 2020/0148924 A1 May 14, 2020

Related U.S. Application Data

(62) Division of application No. 15/837,356, filed on Dec. 11, 2017, now Pat. No. 10,544,337.

(60) Provisional application No. 62/432,874, filed on Dec. 12, 2016.

(51) Int. Cl.

| C09J 167/06 | (2006.01) |
| C09J 167/00 | (2006.01) |
| B05D 3/04 | (2006.01) |
| B05D 7/14 | (2006.01) |
| C09D 167/06 | (2006.01) |
| C09D 5/34 | (2006.01) |
| C09D 7/65 | (2018.01) |
| C08K 3/26 | (2006.01) |
| C08K 5/01 | (2006.01) |
| C08K 3/22 | (2006.01) |
| C08K 3/34 | (2006.01) |

(52) U.S. Cl.
CPC .......... *C09J 167/06* (2013.01); *B05D 3/0413* (2013.01); *B05D 3/0426* (2013.01); *B05D 7/14* (2013.01); *C09D 5/34* (2013.01); *C09D 7/65* (2018.01); *C09D 167/06* (2013.01); *C09J 167/00* (2013.01); *C08K 3/22* (2013.01); *C08K 3/26* (2013.01); *C08K 3/34* (2013.01); *C08K 3/346* (2013.01); *C08K 5/01* (2013.01); *C08K 2003/2241* (2013.01); *C08K 2003/265* (2013.01)

(58) Field of Classification Search
CPC ...... C09D 5/34; C09D 167/06; C09D 167/07; C08J 3/223; C08J 3/226; C08K 5/17; C09J 167/06; C09J 167/07; C08L 67/06; C08L 67/07
See application file for complete search history.

(56) References Cited

U.S. PATENT DOCUMENTS

| 3,873,475 | A | * | 3/1975 | Pechacek ................. C08K 7/22 523/509 |
| 4,980,414 | A | * | 12/1990 | Naton ...................... C08L 67/06 427/388.3 |
| 2013/0004663 | A1 | | 1/2013 | Adams et al. |

FOREIGN PATENT DOCUMENTS

| JP | 2002121476 A | 4/2002 |
| WO | 9519379 A1 | 7/1995 |

OTHER PUBLICATIONS

Storey (Tertiary Aromatic Amines As Cure Reaction Promoters For Unsaturated Polyester Resins. II. Low Temperature Studies, Journal of Applied Polymer Science, vol. 32, 1986, pp. 4919-4930).*
U.S. Appl. No. 15/837,356, filed Dec. 11, 2017.
Int'l. Search Report for PCT/US2017/065566, dated Mar. 6, 2018.

\* cited by examiner

*Primary Examiner* — Brieann R Johnston
(74) *Attorney, Agent, or Firm* — Blue Filament Law PLLC

(57) ABSTRACT

An Additive Package is provided to adjust the cure properties of a two-part bonding filler across a temperature range of from 4 and 44 degrees Celsius. A low temperature additive speeds a cure rate between 4 and 15 degrees Celsius and a high temperature additive slows down a cure rate between 25 and 44 degrees Celsius. The amount of Additive Package is varied to account for the desired cure properties. The Additive Package includes a first unsaturated polyester resins with an average degree of unsaturation of 70-100 percent based on total acid and anhydride monomer content. A process for repairing a vehicle body is provided using the Additive Package. A kit for accomplishing repairs in an after-market repair setting is also provided.

7 Claims, No Drawings

AUTOBODY REPAIR FORMULATION WITH IMPROVED CONTROL OF WORK TIME AND CURE TIME AT EXTREME AMBIENT AIR TEMPERATURES

RELATED APPLICATIONS

This application is a division of U.S. patent application Ser. No. 15/837,356, filed Dec. 11, 2017, now U.S. Pat. No. 10,544,337B 1 that in turn claims priority benefit of U.S. Provisional Patent Appln. No. 62/432,874, filed Dec. 12, 2016, the contents of which are hereby incorporated by reference.

FIELD OF THE INVENTION

The present invention in general relates to unsaturated polyester formulation for vehicle body repair having an additive with improved control of work time and cure time at extreme ambient air temperatures; the unsaturated polyester composition also able to strongly adhere to metal substrates found on vehicle body panels and bumpers.

BACKGROUND OF THE INVENTION

Unsaturated polyester resins have been used in varied applications, such as in polyester vehicle body filler systems and glass reinforced polyester vehicle body filler systems used in the automotive body repair field. These body fillers are used in the automotive repair aftermarket industry under a wide range of ambient air temperatures based on seasonal variations and in different regions around the world. In countries that lie near the Equator, temperatures often exceed 35 degrees Celsius. Furthermore, the use of air conditioning in automotive repair shops is not widespread even in temperate climates during summer months. Similarly, in colder climates, even when heaters are used, temperatures rarely reach 20 degrees Celsius owing to the need for ventilation. At high ambient temperatures, relative to the optimized cure temperature of 20 degrees Celsius, vehicle body repair formulations currently used by the industry tend to cure too quickly; and usage at below the optimal cure temperature, vehicle body repair formulations currently used by the industry tend to cure too slowly. Such extreme ambient temperatures, and the negative effects they have on cure time, lead to defects such as tacky surface, poor featheredging, poor adhesion, blistering, lifting and pinholing. Adjusting the amount of catalyst present in the formulation is a method currently used in the industry to try to mitigate this problem. However, in practice it is extremely difficult to accurately adjust the amount of catalyst on-site because most vehicle body repair shops do not have scales and technicians cannot accurately measure out the proper amount of catalyst or homogenously mix the same into a mastic. Another method currently used in the industry is the use of heating or cooling equipment to mitigate the effect extreme ambient temperatures has on cure time of vehicle body repair formulations. However, many automotive repair shops do not have adequate equipment. Infrared lamps, for example, can be quite expensive and require a skilled operator to avoid blistering and lifting on the vehicle part being repaired. Additionally, blower fans tend to impart particulate into the finish and create skinning of the curing formulation.

Thus, there exists a need for a polyester resin formulation with additive that provides control of work time and cure time at extreme ambient temperatures. There further exists a need for a formulation that cures within an appropriate amount of time via exposure to ambient air alone, thus dispensing without the need for additional equipment to achieve an appropriate cure time.

SUMMARY OF THE INVENTION

A vehicle body repair formulation is provided that includes a polyester resin having an average degree of unsaturation of between 25 and 60 molecule percent based on total acid and anhydride monomer content. The polyester resin is dissolved or suspended in a monomer reactive diluent. A separately stored initiator package is also provided. An Additive Package is provided to adjust the cure properties of a Part A across a temperature range of from 4 and 44 degrees Celsius with a temperature adjusted cure rate and in particular, a low temperature additive speeds a cure rate which is desired between 4 and 15 degrees Celsius or a high temperature additive slows down a cure rate which is desired at 25 and 44 degrees Celsius. The amount of Additive Package and whether the additive accommodates higher or lower temperatures than 20 degrees Celsius is adjustable by a user. After mixture with a Part B that contains an initiator package including peroxide cure catalyst, the resulting homogenous uncured filler paste has a work time of between 2 and 4 minutes and a cure time of between 13 and 25 minutes at temperatures of between 4 and 44 degrees Celsius. The Additive Package includes a first unsaturated polyester resins with a degree of unsaturation of 70-100 percent based on total acid and anhydride monomer content, a second polyester pre-reacted with a fatty acids, along with amounts of promoter to compensate for the cure temperature, and also includes a cure promoter. The reactive diluent monomer can be chosen to be styrene or a non-styrenic diluent to improve performance properties. Microspheroids may also be provided to enhance the sandability of a cured formulation.

The low temperature Additive Package when cured only with the constant amount of Part B, such as 2 total weight percent of curative of which half by weight is active cure catalyst, has a gel time of between 1 second and 1 minute at 25 degrees Celsius and a viscosity of between 25,000 and 40,000 cP at 37 degrees Celsius.

The high temperature Additive Package when cured only with the constant amount of Part B, such as 2 total weight percent of curative of which half by weight is active cure catalyst, has a gel time of between 10 minutes and 40 minutes at 25 degrees Celsius and a viscosity of between 60,000 and 90,000 cP at 37 degrees Celsius.

A process for repairing a vehicle body is provided that includes a polyester resin formulation part A that includes a polyester resin having an average degree of unsaturation of between 25 and 60 molecule percent based on total acid and anhydride monomer content being mixed with a part B initiator package to form a curable mixture. An Additive Package includes a first unsaturated polyester resin with a degree of unsaturation of 70-100 percent based on total acid and anhydride monomer content, a second polyester pre-reacted with a fatty acids, and a high loading of between 0.03 and 3 total weight percent of the additive package of cure promoters. The promoters being metal-amine complexes, tertiary amines, or a combination thereof. The additive package in mixed with the part A prior to admixing part B to adjust the cure behavior to account for a cure temperature of between 4 and 15 or between 25 and 44 degrees Celsius. The Additive Package is mixed with the Part A in selective amounts as a form of cure temperature compensation and then mixed with Part B.

The cure catalyst is provided in constant amount, such as 2 total weight percent of curative of which half by weight is active cure catalyst, that allows one to obtain a work time for the fully mixed filler between 2 and 4 minutes and a cure time of the mixture at 15 to 20 minutes at temperatures of between 4 and 44 degrees Celsius. The mixture is applied to a substrate of the vehicle body in need of repair. The filler mixture in contact with the substrate can be allowed to cure under ambient conditions (4 to 44 degrees Celsius). The filler paste is cured to form a fill to repair the vehicle body. Finally, cured fill is sanded within 15 to 20 minutes of applying the mixture to the substrate of the vehicle body in need of repair. A kit for accomplishing repairs in an aftermarket repair setting is also provided.

DETAILED DESCRIPTION OF THE PREFERRED EMBODIMENTS

The present invention has utility as a vehicle body repair formulation with control of work time and cure time at extreme ambient temperatures of between 4 and 44 degrees Celsius. The formulation cures within pre-selected amount of time via exposure to ambient air alone, even in these extreme ambient air temperatures, and with handling properties consistent with a conventional formulation at 20 degrees Celsius cure conditions by inclusion of a cure temperature dependent amount the Additive Package.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

As used herein, "standard temperature and pressure" (STP) means approximately 20 degrees Celsius and atmospheric pressure.

As used herein, "standard cure formulations" refers to vehicle body repair formulations of the prior art which generally are intended to cure at a standard temperature and pressure.

As used herein, cure occurring above standard temperature and pressure (STP) and up to 44 degrees Celsius is defined as "high temperature".

Similarly, as used herein, cure occurring below standard temperature and pressure (STP) and as low as 4 degrees Celsius is defined as "low temperature".

As used herein, "an average degree of unsaturation" as defined for a polyester resin is based on dividing the total number of unsaturation sites present on all the polyester resin by the total number of sites in the polyester resin, both saturated and unsaturated; the ratio multiplied by 100. By way of example, with equal molar amounts of fully saturated polyester resins and unsaturated polyester resins (UPEs) yields an average degree of saturation of 50 percent.

As used herein, "gel time" describes the thickening of a resin after it is mixed, tested at an elevated temperature. Gel time is determined by heating the mixture and observing when it starts to become stringy, or gel-like, though not quite fully cured. Once a resin reaches its gel time, there is limited shift in resin or component placement, but the cure is not complete.

As used herein, "sandable" with reference of a cured inventive formulation is defined as having limited clogging of sandpaper and able to form a smooth and unbroken featheredge in less than 20 minutes at 25 degrees Celsius with a 60 to 180 grit sandpaper.

As used herein, "non-brittle" with reference of a cured inventive formulation is defined as not cracking or crazing from thermal expansion/contraction between 34 and 65 degrees Celsius over 20 cycles as measured by ASTM D6944-03 and ASTM D522-13.

Part A

A Part A is based on a polyester resin and has an average degree of ethylenic unsaturation that is between 25 and 60 molar percent of the dicarboxylic acids and anhydrides in the polyester resin and denotes reactivity within the polyester resin backbone to free radical polymerization. For purposes of calculating monomer percent, reactive diluents are omitted.

Suitable unsaturated acids or anhydrides used in the synthesis of inventive polyester resins include maleic anhydride, maleic acid, fumaric acid, itaconic acid and related derivatives that retain the ethylenic unsaturation, and combinations of the aforementioned. These are present from 25 to 60 molar percent of the non-alcoholic monomer. In some inventive embodiments, from 50 to 60 mole percent.

Saturated multifunctional carboxylic acids or anhydrides operative herein illustratively include phthalic acid, isophthalic acid, terephthalic acid, hexahydrophthalic acid, tetrahydrophthalic acid, cyclohexane dicarboxylic acid, adipic acid, succinic acid, malonic acid, nadic acid, trimellitic acid, pyromellitic acid, anhydrides of any of the aforementioned, and combinations thereof. Saturated monofunctional carboxylic acids operative herein in polyester resin formation according to the present invention illustratively include benzoic acid, 2-ethylhexanoic acid, lauric acid, and combinations thereof. In some inventive embodiments, the total saturated carboxylic acid and anhydride monomer content is 0 to 40 molar percent.

In some inventive embodiments, nadic acid and phthalic acid are used resulting in 25 to 60 percent unsaturation.

The dicarboxylic acid and anhydrides are reacted with any combination of monofunctional, bifunctional, or polyfunctional alcohols. Monofunctional alcohols operative herein illustratively include benzyl alcohol, 2-ethyl hexanol, lauryl alcohol, cyclohexanol, and combinations thereof. Bi- and multi-functional alcohols operative herein illustratively include ethylene glycol, diethylene glycol, triethylene glycol, propylene glycol, dipropylene glycol, tripropylene glycol, neopentyl glycol, butane diol, butyl ethyl propane diol, trimethylol propane, hexane diol, cyclohexane dimethanol, glycerol, pentaerythritol, polyether polyols, and combinations thereof. The amount of total alcohols in an inventive polyester resin range from about 100 to about 120 mole percent relative to the total carboxylic acid and anhydride content.

In some inventive embodiments, propylene glycol is used as the alcohol and in still other embodiments, propylene glycol is condensed with either maleic acid or a combination of nadic acid and phthalic acid are used resulting in 50 percent unsaturation. In still other inventive embodiments, propylene glycol and diethylene glycol are used in a molecular ratio of between 0.1-10:1 and in still other embodiments, propylene glycol and diethylene glycol are condensed with either maleic acid or a combination of nadic acid and phthalic acid are used resulting in 50 percent unsaturation. In still other embodiments, propylene glycol and diethylene glycol are condensed with monomers to form a polyester with hydroxyl and amine pendant functionality.

The unsaturation in a polyester backbone is reactive with styrene, or vinyl or allyl moieties of a non-styrenic molecule through free-radical polymerization.

An inventive polyester resin formulation in certain embodiments includes a polyester resin with styrene or a non-styrenic molecule as the sole diluent. The polyester formulation is modified with specialized additives to control the free-radical polymerization so as to minimize exothermic heating and shrinkage. To further maximize the resulting cured polyester composite toughness and adhesion, in some inventive embodiments, a thermoplastic filler is also incorporated.

In some embodiments, an inventive unsaturated polyester resin is terminally functionalized with molecules illustratively including allyl glycidyl ether, glycidyl methacrylate, trimethylolpropane diallyl ether, allyl pentaerythritol or polymeric allyl glycidyl ether. Typical amounts of terminally functionalizing molecules range from 1 to 3 molecular percent relative to the total carboxylic acid and anhydride monomer content.

An inventive unsaturated polyester is readily formed in a single or multi-stage reactions. Typical reaction temperatures range from 130-240 degrees Celsius and in some embodiments in a range from 180 to 230 degrees Celsius. A conventional esterification catalyst is present and illustratively includes acids, transition metal catalysts and organotin compounds. Typical catalyst loadings range from 0.01 to 1 total weight percent of the reactants.

Reactive polyester resins used in a body filler formulation have a weight average molecular weight ranging from 500 to 3000 and in still other embodiments from 1000 to 2000.

To form a body filler formulation, the resulting reactive polyester resin is dissolved in a styrene or non-styrenic reactive diluent. The diluent is present from 20 to 100 percent by weight relative to the unsaturated polyester.

Reactive diluents operative herein include acrylics, acrylates, and methacrylates such as methyl methacrylate, butyl acrylate, ethyl-hexyl acrylate, hydroxypropyl methacrylate, hydroxyethyl methacrylate, lauryl acrylate, stearyl methacrylate, lauryl methacrylate, butanediol diacrylate, ethyleneglycol dimethacrylate, ethyleneglycol-DCPD methacrylate, ethyl(meth)acrylate and n- and isobutyl(meth)acrylate, cyclohexyl(meth)acrylate, isobornyl(meth)acrylate, benzyl (meth)acrylate, butyleneglycol dimethacrylate, diethyleneglycol dimethacrylate, triethyleneglycol dimethacrylate, propyleneglycol dimethacrylate, dipropyleneglycol dimethacrylate, tripropyleneglycol dimethacrylate and trimethylolpropane triacrylate, or DCPD diacrylate; ether monomers of the structure (C1-C6 alkyl)-O—(C2-C6 alkylene) such as ethyl vinyl ether, or methyl vinyl ether; vinyl toluene, allyl substituted benzene, di-vinyl benzene, di- and trifunctional acrylates (commercially available for example as SARTOMER® and MIRAMAR® products), acrylonitrile, mono-vinyl-terminated polydimethylsiloxanes, and combinations of any of the aforementioned. It should be appreciated that a phenyl ring having two moieties in the aforementioned list is intended to include ortho isomers, para isomers, meta isomers, and isomeric mixtures of each.

In some embodiments, the reactive diluent is a non-styrenic aryl monomer. A non-styrenic aryl monomer is defined herein as any aromatic molecule with vinyl functionality. In particularly useful embodiments, the reactive diluent is vinyl toluene as this retains accelerated sanding times and properties of conventional formulations using styrene as the reactive diluent, with the added benefit of reducing the risk of environmental contamination and employee exposure to styrene.

Adjuncts are present in an inventive unsaturated polyester formulation to improve at least one property of performance, storage stability, cure rate, sandability, or substrate adhesion. The adjuncts illustratively include at least one of a thixotropic agent, a pigment, a dye, a suppressant, a filler, a promoter, an inhibitor, a leveling agent, a wetting agent, and a moisture scavenger. It is highly desirable in the industry that a cured fill be sandable within 15 to 20 minutes after application to a vehicle body without flowing regions that smudge or otherwise deform during sanding operations.

A thixotropic agent operative in the present invention illustratively includes fumed silica, organoclays, inorganic clays and precipitated silica. Multifunctional alcohols are commonly used to enhance thixotropic properties. A thixotropic agent is present from 0-3.0 percent by weight of a complete formulation for application to a substrate. The thixotropic agent is typically present from 0.5 to 2 total weight percent of a complete formulation for application to a substrate.

A pigment or dye operative in the present invention illustratively includes titanium dioxide, carbon black, iron oxides, phthalocyanine blue and other colorants. These pigments and dyes are amenable to dissolution or suspension in the reactive diluent. A pigment or dye is present from 0 to 10 total weight percent of a complete formulation for application to a substrate.

A suppressant reduces vapor emissions and in some embodiments enhances cure time. A suppressant operative in the present invention illustratively includes waxes; specifically including paraffins; polyethers; polysiloxanes; and various block copolymers. A suppressant is present from 0 to 5 total weight percent of a complete formulation for application to a substrate.

Fillers operative in the present invention illustratively include talc, mica, alumina trihydrate, calcium sulfate, calcium carbonate, magnesium sulfate, magnesium carbonate, barium sulfate, microspheres and the like. A filler is present from 0 to 70 percent of a complete formulation for application to a substrate. Fillers of the present invention typically have a longest linear dimension of 0.5 to 20 microns.

As used herein a microsphere is defined to include a hollow microsphere having an aspect ratio of between two normal maximal linear dimensions of between 1 and 1.6. Typically, a spheroid particle is formed of glass or a thermoplastic material. In some inventive embodiments, the microspheroid is within 10 linear dimension percent of spherical and formed of glass. A microsphere typically has a longest linear dimension of between 20 and 150 microns to improve sandability and reduce density. A thermoplastic microspheroid is illustratively formed of acrylonitrile, polymethylmethacrylate (PMMA), phenolic resins, and waxes with melting points precluding melting under formulation cure.

A leveling agent operative in the present invention illustratively includes acrylic resins, fluorocarbons, fluoropolymers and silicones. A leveling agent is present from 0 to 2 total weight percent of a complete formulation for application to a substrate.

A wetting agent operative in the present invention illustratively includes boric acid esters, phosphate esters, fatty acid salts, alkylammonium salts of an acidic copolymer, and polyethers. A wetting agent is present from 0 to 2 total weight percent of a complete formulation for application to a substrate.

A promoter is present to accelerate cure. Cure promoters operative herein include tertiary amines such as dimethyl analine (all analines) (DMAs), diethyl analine (DEA), dimethyl-para-toluidine (all toluidines) (DMPT), dihydroxy-para-toluidine (DHPT), monohydorxy-para-toluidine (MHPT), salts of cobalt (and/or zinc and nickel) and triethylene diamine compounds, and combinations thereof. A cure promoter is present from 0.003 to 5 total weight percent of a complete formulation for application to a substrate.

A cure inhibitor is present to extend shelf storage ability and extend cure time. Cure inhibitors operative herein illustratively include hydroquinone; parabenzoquinone; toluhydroquinone; a substituted quinone such as naphthoquinone (NQ) or trimethylhydroquinone (TMHQ); 4-tert butylcatechol; and metal naphthenates. A cure inhibitor is present from 0.0005 to 1 total weight percent of a complete formulation for application to a substrate.

A moisture scavenger is present to limit humidity induced degradation of uncured components and parts. Moisture scavengers operative herein include zeolites, oxazolidines, aliphatic anhydrides, anhydrous inorganic salts that form hydrates, and combinations thereof. A moisture scavenger is present from 0 to 5 total weight percent of a complete formulation for application to a substrate.

Additive Package

An Additive Package for mixing with part A, and then mixing with a part B has a higher degree of polyester resin unsaturation than the Part A. An unsaturated polyester resin (UPE) operative herein includes condensation polymers of mixtures of saturated isophthalic acid and unsaturated maleic anhydride, dibasic acids with propylene glycol and/or neopentyl glycol, terephthalic resin, and subsequent dilution with styrene monomer. In some inventive embodiments, a high reactivity, resin is a terephthalic resin, with an average degree of unsaturation of between 70 and 100 percent and present with a tertiary amine promoter to provide very short gel time relative to a Part A unsaturated polyester resin is combined with other UPEs. It has been surprisingly found that terephthalic resin is highly efficient in curing thin layer bonding repairs, which are important in small repairs and especially effective at low temperatures. In other inventive embodiments, the UPE is derivatized with fatty acids. An Additive Package is appreciated to include any of the aforementioned additives and in the amounts detailed above. For a low temperature Additive Package, in addition to a high degree of unsaturation polyester resin, the promoter is present from 0.5 to 3 total weight percent of the Additive Package as well as stabilizers.

In some inventive embodiments, a high temperature-denoting colorant is added that signifies a given Additive Package as having an initiator package that provides high temperature cure, yet with handling properties of standard cure formulations. In still other inventive embodiments, a low temperature-denoting colorant is added that signifies a given formulation as having an initiator package that provides low temperature cure, yet with handling properties of standard cure formulations. Thus, a user can tell visually if a given formulation is well suited for high or low cure temperature usage. A colorant is typically present from 0 to 2 weight percent of an additive package and includes those colorants used in Part A, as detailed above.

The Additive Package, either a high temperature or low temperature version is kneaded into a Part A in an amount of from 10 to 60 total weight percent of a full mixed bonding formulation. A table is provided to help a user determine the relative amount of Additive Package and which type to add to Part A. Factors in such a decision as to the amount of Additive Package to be added include: expected ambient cure temperature, volume of formulation estimated to be used, and desired working time.

The Additive Package also includes in certain embodiments the high degree of unsaturated polyester resin, reactive diluents, and any or all of the various ancillary components found in Part A to adjust properties such as storage stability, and viscosity.

Exemplary ranges of components for a high temperature Additive Package are provided in Table 1. These values should not be construed to limit the generic amounts of various components detailed elsewhere.

TABLE 1

High temperature Additive Package, in which weight percentages are weight percentages of the additive package.

| Chemical | Weight percent |
| --- | --- |
| UPE Resin 70-100 percent unsaturation | 2-5 |
| UPE Resin 20-60 percent unsaturation | 28-35 |
| UPE Resin modified with fatty acids | 7-15 |
| Reactive diluent | 3-5 |
| Microspheres | 4-7 |
| Rheological: organoclay | 0.2-0.14 |
| Wetting agent: alkylammonium salt of an acidic copolymer | 0-2 |
| Promoter: tertiary amine | 0.03-0.5 |
| Pigment paste | 0.1-1 |
| Inhibitor: reacted benzoquinone | 0.01-0.5 |
| Styrene suppressant: paraffin wax | 0.03-0.05 |
| Moisture scavenger: aliphatic anhydride | 0-0.8 |
| Fillers/pigments | Remainder such as: |
| Pigment: TiO2 | 0-6.0 |
| Calcium carbonate: 0.5-15 micron | 0-40.0 |
| Talc 1: 0.5-10.0 micron | 0-10.0 |
| Talc 2: 10-20 micron | 0-40.0 |

Exemplary ranges of components for a low temperature Additive Package are provided in Table 2.

TABLE 2

Low temperature Additive Package, in which weight percentages are weight percentages of the additive package.

| Chemical | Weight percent |
| --- | --- |
| UPE Resin 70-100 percent unsaturation | 20-40 |
| UPE Resin modified with fatty acids | 10-25 |
| Reactive diluent | 3-8 |
| Microsphere A | 1-8 |
| Rheological: organoclay | 0.5-0.9 |
| Promoter: tertiary amine | 0.5-3 |
| Pigment paste | 0-5 |
| Inhibitor 1: reacted benzoquinone | 0.5-1.5 |
| Styrene suppressant: paraffin wax | 0-0.5 |
| Moisture scavenger: aliphatic anhydride | 0.1-5 |
| Fillers/pigments | Remainder such as: |
| Pigment: TiO2 | 0-6.0 |
| Calcium carbonate: 0.5-15 micron | 0-30.0 |
| Talc 1: 0.5-10.0 micron | 0-10.0 |
| Talc 2: 10-20 micron | 0-30.0 |

A resin formulation is stored as a Part A that includes all components with the exception of an initiator package, and a Part B containing an initiator package, described below, that is mixed with the Part A immediately before application to the vehicle body substrate. The Additive Package represents a third component that added to adjust for cure temperature and therefore to avoid the need of ancillary heat or cooling sources during body repairs.

The Additive Package is premixed in a selected amount with a Part A and the admixture combined with a Part B to adjust for control of a work time of the formulation to between 2 and 4 minutes and control of a cure time of the formulation at temperatures of between 4 and 44 degrees Celsius. The low temperature Additive Package when cured only with Part B has a gel time of between 1 second and 1 minute at 25 degrees Celsius and a viscosity of between 25,000 and 40,000 cP as measured at 37 degrees Celsius. In another inventive embodiment, the low temperature Additive Package has a gel time of between 5 and 55 seconds at 25 degrees Celsius and a viscosity of between 25,000 and 32,000 cP as measured at 37 degrees Celsius.

The high temperature Additive Package when cured only with Part B has a gel time of between 10 minutes and 40 minutes at 25 degrees Celsius and a viscosity of between 40,000 and 90,000 cP as measured at 37 degrees Celsius. In one inventive embodiment, the high temperature Additive Package has a gel time of between 12 and 35 minutes at 25 degrees Celsius and a viscosity of between 62,000 and 75,000 cP as measured at 37 degrees Celsius. In a preferred embodiment, the high temperature Additive Package has a gel time of between 12 and 35 minutes at a temperature of 25 degrees Celsius and a viscosity of between 62,000 and 75,000 cP as measured at 37 degrees Celsius.

Part B

The resin compositions of the present invention cross-link with the reactive diluent by use of a number of free-radical initiators that include organic peroxide, azo-type initiators, and combinations thereof. Peroxide initiators operative herein illustratively include diacylperoxides, hydroperoxides, ketone peroxides, peroxyesters, peroxyketals, dialkyl peroxides, alkyl peresters and percarbonates. Exemplary peroxide free-radical initiators are methyl ethyl ketone peroxide (MEKP)/cobalt octoate/N, N-dimethylaniline (DMA) and benzoyl peroxide (BPO)/DMA. Azo-type initiators operative herein illustratively include azobisisobutyronitrile (AIBN). Chemical initiators are typically present from 1 to 3 total weight percent of a fully mixed and applied polyester resin formulation.

The Part B includes in some inventive embodiments, a stabilizer and a plasticizer. It is appreciated that other components with the exception of the polyester resin are also present in certain embodiments in the initiator package. As a result, the weight ratio of Part A:Part B is from to 1-100:1 or 1 to 3 total weight percent catalyst to total weight percent filler.

Usage

Once a Part A, Additive package and a Part B are mixed immediately prior to application to a vehicle substrate, the mixture is then applied to the vehicle substrate and then exposed to ambient air conditions alone to promote cure of the mixture. The mixture is then cured to form a fill to repair the vehicle substrate. The fill is then sanded within 5 to 60 minutes of applying the mixture to the substrate of the vehicle body. More preferably, the fill is sanded within 10 to 30 minutes of applying the mixture to the substrate of the vehicle body. Most preferably, the fill is sanded within 15 to 20 minutes of applying the mixture to the substrate of the vehicle body.

In some inventive embodiments a kit is provided that includes separate container of Part A, Part B, and at least one container of Additive Package, along with instructions for admixing Part A and the Additive Package prior to mixing with Part B; followed by application to a prepared vehicle surface for repair. In some embodiments, two Additive Packages are provided: a high temperature Additive Package with a first colorant and a low temperature package with a second colorant. In this way, a user is aware of correct mixing for a given cure temperature based on the final color of the Part A and Additive Package mixture or the fully formulated fill formulation.

Cure times are typically between 5 and 60 minutes, while in other inventive embodiments, the cure time is between 10 and 20 minutes. This range of cure times manifests as "dry to sand" (DTS) times of between 5 and 30 minutes. In still other inventive embodiments, DTS time is between 15 and 20 minutes. At DTS, the resulting filler has sufficient bond strength to the substrate to render a "featheredge," meaning no tearing or chipping at the perimeter edge of the filler.

The present invention is further described with respect to the following non-limiting examples. These examples are intended to illustrate specific formulations according to the present invention and should not be construed as a limitation as to the scope of the present invention.

Example 1

A first set of vehicle body fillers are produced by mixing components based on different ratios (10/90, 20/80, 30/70, 50/50) of Part A to an Additive Package. The Part A being one of several commercially available fillers and putties sold under the brand name EVERCOAT®, as described in the following tables. The properties of the High Temperature Additive package were tested at 75, 95 and 110 degrees Fahrenheit (24, 32, and 43 degrees Celsius, respectively), while the Low Temperature Additive Package were tested at 40, 55, and 70 degrees Fahrenheit (4, 8, and 21 degrees Celsius, respectively). The Additive Package is thoroughly mixed with Part A before addition of a 2 total weight of a BPO curative paste containing 50 weight percent active ingredient to avoid localized gelation.

A typical preparation for a Part A or an Additive Package includes the appropriate resins being added into a mixing vessel and placed under a hi-torque mixer with a shear blade. Under slow rpm, any needed "additives", suppressants, and rheological additives are added slowly until uniformly dispersed. Mixer rpm is increased to approx. 2500 and blend is sheared for 3 minutes. Fillers are added one at a time and afterwards the entire mixture sheared for another 15 minutes. The shear blade is now replaced with a blending blade. Microspheres are then added and mixed under moderate rpm for 10 minutes. Mixture is then adjusted as needed to meet viscosity and gel time specifications.

The properties of the present invention are compared with prior art formulations as provided in Table 3.

TABLE 3

Comparison of inventive vehicle body repair formulations with prior art filler compositions. Effect of High temperature Additive (HTA) on Work Time at 2 total weight percent BPO catalyst (50percent active paste) at 44 degrees Celsius.

| Sample description | Work time (min) | Dry to sand (min) | Surface clogg-ing | Sand quality | Feather-edge time (min) | Feather-edge quality |
|---|---|---|---|---|---|---|
| Filler1 Control | 1.33 | 20 | 5 | 6 | 22 | 7 |
| Filler1/HTA 90/10 | 1.67 | 20 | 5 | 6 | 22 | 7 |
| Filler1/HTA 80/20 | 1.83 | 20 | 5 | 6 | 22 | 7 |
| Filler1/HTA 70/30 | 2.00 | 20 | 5 | 6 | 22 | 7 |
| Filler1/HTA 50/50 | 2.50 | 20 | 5 | 6 | 22 | 7 |
| Filler2 Control | 0.93 | 20 | 4.5 | 7 | 22 | 7 |

TABLE 3-continued

Comparison of inventive vehicle body repair formulations with prior art filler compositions. Effect of High temperature Additive (HTA) on Work Time at 2 total weight percent BPO catalyst (50percent active paste) at 44 degrees Celsius.

| Sample description | Work time (min) | Dry to sand (min) | Surface clogging | Sand quality | Feather-edge time (min) | Feather-edge quality |
|---|---|---|---|---|---|---|
| Filler2/HTA 90/10 | 1.18 | 20 | 4.5 | 7 | 22 | 7 |
| Filler2/HTA 80/20 | 1.50 | 20 | 4.5 | 7 | 22 | 7 |
| Filler2/HTA 70/30 | 2.06 | 20 | 4.5 | 7 | 22 | 7 |
| Filler2/HTA 50/50 | 2.72 | 20 | 4.5 | 7 | 22 | 7 |
| Putty1 Control | 0.87 | 20 | 5.5 | 6.5 | 22 | 7 |
| Putty1/HTA 90/10 | 1.12 | 20 | 5.5 | 6.5 | 22 | 7 |
| Putty1/HTA 80/20 | 1.58 | 20 | 5.5 | 6.5 | 22 | 7 |
| Putty1/HTA 70/30 | 1.75 | 20 | 5.5 | 6.5 | 22 | 7 |
| Putty1/HTA 50/50 | 2.72 | 20 | 5.5 | 6.5 | 22 | 7 |

TABLE 4

Effect of Low temperature Additive (LTA) on Work Time at 2percent BPO Catalyst (50percent active paste) at 8 C.

| Sample description | Work time (min) | Dry to sand (min) | Surface clogging | Sand quality | Feather-edge time (min) | Feather-edge quality |
|---|---|---|---|---|---|---|
| Filler1 Control | 10.33 | 35 | 5.2 | 6 | 37 | 7 |
| Filler1/LTA 90/10 | 6.83 | 29 | 5.5 | 6 | 31 | 7 |
| Filler1/LTA 80/20 | 5.33 | 21 | 5.5 | 6 | 23 | 7 |
| Filler1/LTA 70/30 | 4.43 | 18.5 | 6 | 6.5 | 20 | 7 |
| Filler1/LTA 50/50 | 3.48 | 17.5 | 6.2 | 6.5 | 19 | 7 |
| Filler2 Control | 7.62 | 30 | 6.5 | 7 | 32 | 7 |
| Filler2/LTA 90/10 | 6.17 | 24 | 6.5 | 7 | 26 | 7 |
| Filler2/LTA 80/20 | 4.56 | 20 | 7 | 7.5 | 21 | 7 |
| Filler2/LTA 70/30 | 3.67 | 17 | 7 | 7.5 | 19 | 7 |
| Filler2/LTA 50/50 | 2.82 | 15 | 7 | 7.5 | 17 | 7 |
| Putty1 Control | 6.48 | 30 | 5 | 6 | 32 | 7 |
| Putty1/LTA 90/10 | 4.93 | 27 | 5 | 6 | 29 | 7 |
| Putty1/LTA 80/20 | 4.13 | 16.5 | 6 | 6.5 | 19 | 7 |
| Putty1/LTA 70/30 | 3.87 | 15 | 6.5 | 7 | 17 | 7 |
| Putty1/LTA 50/50 | 2.75 | 13.5 | 6.8 | 7 | 15 | 7 |

The above data shows that: gel time can be adjusted with the additive to the desired value, typically 2.5-3.5 minutes, depending on temperature and size of repair; the amount of BPO catalyst remains at the same level thus eliminating guessing how much catalyst to add; the exact amount of additive is not critical to get acceptable gel time, and is important for a technician who does not have a scale; the other performance characteristics, such as sandability, sand paper clog, featheredge, are not affected by the additive; and the additive package viscosity can be adjusted to compensate for Part A viscosity at a given temperature. Generally, the additive package for elevated temperatures relative to room temperature has a higher viscosity to compensate for a lower viscosity of the Part A at elevated temperatures and vice versa for the lower temperature additive package.

As a person skilled in the art will recognize from the previous detailed description and from the figures and claims, modifications and changes can be made to the preferred embodiments of the invention without departing from the scope of this invention defined in the following claims.

The invention claimed is:

1. A curable vehicle body repair Additive Package formulation to compensate for a cure temperature of a Part A that includes a polyester resin, where the additive package formulation is adapted to be kneaded into a Part A in an amount of 10-60 wt %, and then mixing with a common Part B, the additive package comprising:
    a first polyester resin having an average degree of unsaturation of between 70 and 100 molar percent based on total acid and anhydride monomer content and has a higher degree of unsaturation than the polyester resin in Part A;
    a second polyester resin reacted with a fatty acid;
    a monomer reactive diluent in which said first polyester resin and second polyester resin are dissolved or suspended; and
    a cure promoter selected from metal-amine complexes, tertiary amines, or a combination thereof;
    wherein said cure promoter is present in an amount of 0.5 to 3 wt % of the additive package for curing Part A at the cure temperature of between 4 and 21 degrees Celsius, or
    wherein said cure promoter is present in an amount of 0.03 to 0.5 wt % of the additive package for curing Part A at a cure temperature of between 24 and 44 degrees Celsius.

2. The formulation of claim 1 wherein said cure promoter is only said tertiary amine.

3. The formulation of claim 1 wherein said first or second polyester resin is a terephthalic resin.

4. The formulation of claim 1 wherein the formulation is independent of a cure catalyst.

5. The formulation of claim 1 further comprising at least one of: an inhibitor, a thixotropic material, and a talc.

6. The formulation of claim 1 further comprising microspheroids.

7. The formulation of claim 1 further comprising one of a high temperature cure-denoting colorant and a low temperature cure-denoting colorant.

* * * * *